United States Patent
Abe (10) Patent No.: US 9,521,017 B2
(45) Date of Patent: Dec. 13, 2016

(54) DIVERSITY RECEPTION DEVICE, DIVERSITY RECEPTION METHOD, RECEPTION PROGRAM, AND RECORDING MEDIUM

(71) Applicant: PIONEER CORPORATION, Kanagawa (JP)

(72) Inventor: Yoshinori Abe, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/893,081

(22) PCT Filed: May 24, 2013

(86) PCT No.: PCT/JP2013/064454
§ 371 (c)(1),
(2) Date: Nov. 23, 2015

(87) PCT Pub. No.: WO2014/188578
PCT Pub. Date: Nov. 27, 2014

(65) Prior Publication Data
US 2016/0173298 A1    Jun. 16, 2016

(51) Int. Cl.
*H04B 7/02*    (2006.01)
*H04L 25/02*   (2006.01)
(Continued)

(52) U.S. Cl.
CPC ..... *H04L 25/0202* (2013.01); *H04L 25/03019* (2013.01); *H04L 27/2636* (2013.01);
(Continued)

(58) Field of Classification Search
CPC .... H04L 25/0202; H04L 27/2649; H04L 1/02; H04B 7/02; H04B 7/08
See application file for complete search history.

(56) References Cited

U.S. PATENT DOCUMENTS 4,271,525 A * 6/1981 Watanabe ................ H04L 1/02
375/232
6,148,037 A    11/2000 Abe
(Continued)

FOREIGN PATENT DOCUMENTS

JP    H09-289528    11/1997
JP    2005-278111   10/2005
(Continued)

OTHER PUBLICATIONS

International Search Report—PCT/JP2013/064454—Jul. 9, 2013.
(Continued)

*Primary Examiner* — Jean B Corrielus
(74) *Attorney, Agent, or Firm* — Young & Thompson (57) ABSTRACT

The present invention calculates an echo profile on the basis of: a complex baseband signal generated in a front end (2#*b*) on the basis of a received signal transmitted by an antenna (1#*b*); and a transmission symbol estimated value (dfin) supplied by a trellis decoder (8). With the estimated transmission symbol (dfin) as a filter input, the echo profile is calculated on the basis of a filter coefficient of an adaptive filter having a received signal as the desired filter-output signal. On the basis of the calculated echo profile, a sampling-frequency control unit (10) controls the sampling frequency of the baseband signal in the front end (2#*b*). As a result, it is possible to perform a highly accurate timing-recovery control.

7 Claims, 7 Drawing Sheets

(51) Int. Cl.
    *H04L 27/26* (2006.01)
    *H04L 25/03* (2006.01)
    *H04B 7/08* (2006.01)

(52) U.S. Cl.
    CPC ...... *H04L 27/2649* (2013.01); *H04L 27/2662* (2013.01); *H04B 7/02* (2013.01); *H04B 7/08* (2013.01); *H04B 7/0837* (2013.01); *H04L 27/2695* (2013.01); *H04L 2025/03382* (2013.01)

(56) References Cited

U.S. PATENT DOCUMENTS

| | | | |
|---|---|---|---|
| 2008/0291336 A1* | 11/2008 | Kim | H04B 7/0814 348/729 |
| 2009/0161748 A1 | 6/2009 | Wang | |
| 2010/0183097 A1 | 7/2010 | Soga et al. | |
| 2011/0004806 A1 | 1/2011 | Adachi | |

FOREIGN PATENT DOCUMENTS

| | | |
|---|---|---|
| JP | 2009-253844 | 10/2009 |
| JP | 2011-015290 | 1/2011 |
| WO | 2007/148452 | 12/2007 |

OTHER PUBLICATIONS

Advanced Television Systems Committee—Recommended Pratice; Guide to the Use of the ATSC Digital Television Standard, including Corrigendum No. 1—Doc. A/54A , Dec. 20, 2006, pp. 1-110.
Advance Television Systems Committee ATSC Technology Group Report: DTV Signal Reception and Processing Considerations, Doc. T3-600r4—Sep. 18, 2003—pp. 1-86.

\* cited by examiner

{c(q)}: after masking

DIVERSITY RECEPTION DEVICE, DIVERSITY RECEPTION METHOD, RECEPTION PROGRAM, AND RECORDING MEDIUM

TECHNICAL FIELD

The present invention relates to a diversity reception device that receives and demodulates a signal digitally modulated according to a single carrier modulation format, to a diversity reception method, to a reception program, and to a recording medium upon which such a reception program is recorded.

BACKGROUND ART

In recent years, terrestrial digital broadcasting has spread worldwide. While there are a plurality of standards relating to terrestrial digital broadcasting, the ATSC (Advanced Television System Committee) standard is employed in the USA, Canada, Mexico, and South Korea. As modulation format, the ATSC standard employs 8VSB modulation (8-ary Vestigial Sideband Modulation), which is a type of single carrier modulation.

Upon comparison of the ATSC standard with a standard that employs the multi-carrier modulation method of which the Japanese ISDB-T (Integrated Services Digital Broadcasting—Terrestrial) standard is representative, it has been pointed out that the multipath tolerance of the former is inferior. In particular, its dynamic multipath tolerance, which is required for mobile reception, is extremely low. Due to this, since the start of commercial broadcasting in 1998, no ATSC receiver has existed that, in a practice, has acceptable performance for use in a moving vehicle.

However in recent years, due to the progression of digital demodulation technology, the possibilities for mobile reception of ATSC signals have increased. For example, in Patent Document #1, a receiver configuration is disclosed that is based upon diversity reception and channel estimation.

It is per se known that diversity reception enhances the multipath tolerance. In such diversity reception, the reception performance is improved by combining signals received by a plurality of antennas.

And, a receiver configuration based on channel estimation technique is replacing a prior receiver configuration based on an adaptive equalizer. With current ATSC receivers for fixed reception, a receiver configuration employing an adaptive equalizer has become widely used (refer to Non-Patent Document #1). However, with this prior art type of adaptive equalization technique, during mobile reception, it is difficult to track along a fast fading channel, and this situation is encountered quite often. In particular, the tracking speed gets lower in the case of a diversity receiver, with which it is also necessary to optimize the diversity combination coefficients, in addition to optimizing the equalization coefficients.

By contrast, with a receiver configuration that is based upon channel estimation, a channel impulse response (hereinafter "CIR") or a channel frequency response (hereinafter "CFR") is estimated for each diversity branch (hereinafter "branch"), and, by calculating the optimum diversity combination coefficients and equalization coefficients analytically on the basis of these estimations, it is possible to implement excellent tracking performance even for a fast fading channel.

PRIOR ART DOCUMENT

Patent Documents

Patent Document #1: U.S. Pat. No. 8,045,610

Non-Patent Documents

Non-Patent Document #1: DTV Signal Reception and Processing Considerations (ATSC document number T3-600r4)

SUMMARY OF THE INVENTION

Problem to be Solved by the Invention

However, no mention related to any technique for timing synchronization is found in Patent Document #1 detailed above. Here, timing synchronization means processing to make the symbol frequency on the reception side agree with the symbol frequency on the transmission side.

With a conventional ATSC receiver for fixed reception, two representative timing synchronization techniques have been used.

The first technique utilizes a data segment sink (hereinafter termed a "DSS") as prescribed by the ATSC specification. An example of this type of technique can be seen in "9.2.3" in "Guide to the Digital Television Standard" (ATSC Document number A/54A).

However, it is difficult to employ this type of technique in a severe multi-path environment such as being quite often encountered during mobile reception, because the received DSS waveform is greatly distorted due to the multi-path environment.

The second technique belongs to a group of techniques that are per se known as "spectral line methods". These techniques are ones that utilize the fact that the VSB spectrum is in a complex conjugate relationship with the Nyquist frequency as a boundary, and control the symbol frequency on the reception side so that the phase of the channel transmission characteristic around the Nyquist frequency becomes zero. A technique of this kind can be found, for example, in Japanese Laid-Open Patent Publication H09(1977)-289528 "Sampling timing phase error detector for a VSB modulated signal" and so on.

However, in a severe multi-path environment, it is supposed that the attenuation around the Nyquist frequency is extremely high. In this type of case, the above technique does not work properly.

The present invention takes as its subject mobile reception of a single carrier digitally modulated signal, the possibility of which has become higher due to the recent progression of technology, and its object is to provide a timing synchronization technique adapted thereto.

Means for Solving the Problems

When viewed from a first standpoint, the present invention is a diversity reception device that receives a signal that has been digitally modulated by single carrier modulation, comprising: a plurality of branch processing units to each of which one of a plurality of received signals is individually inputted; a combination and equalization unit calculating an equalized signal from said plurality of received signals; a transmitted symbol estimation unit calculating an estimated transmitted symbol from said equalized signal; and a sampling frequency control unit, wherein each of said branch processing units comprises: a front end unit converting said received signal to a baseband signal; and a channel estimation unit calculating an estimated channel characteristic on the basis of said baseband signal and said estimated transmitted symbol, wherein each of said channel estimation units comprises: an adaptive filter taking said estimated transmitted symbol as filter input and generating a desired filter output signal from said received signal; and an echo profile calculation unit calculating an echo profile from filter coefficients of said adaptive filter, said combination and equalization unit calculates said equalized signal on the basis of said estimated channel characteristic, and said sampling frequency control unit controls sampling frequencies of said baseband signal in said front end units on the basis of said echo profiles.

And, when viewed from a second standpoint, the present invention is a diversity reception method employed by a diversity reception device that receives a signal that has been digitally modulated by single carrier modulation, said diversity reception method comprising the steps of: a branch processing of performing processing upon each of a plurality of received signals; a combining and equalizing of calculating an equalized signal from said plurality of received signals; a transmitted symbol estimating of calculating an estimated transmitted symbol from said equalized signal; and a sampling frequency controlling of performing control of sampling frequencies in front end units, wherein said branch processing step comprises: a signal band conversion step of converting said received signal to a baseband signal; and a channel estimation step of calculating an estimated channel characteristic on the basis of said baseband signal and said estimated transmitted symbol, and said channel estimation step comprises: an echo profile calculation step of calculating an echo profile from the filter coefficients of an adaptive filter that takes said estimated transmitted symbol as filter input and generates a desired filter output signal from said received signal, said equalized signal is calculated by said combining and equalizing step on the basis of said estimated channel characteristic, and the sampling frequencies of said baseband signal are controlled by said sampling frequency controlling step on the basis of said echo profile.

Furthermore, when viewed from a third standpoint, the present invention is a non-transient computer readable medium having recorded thereon a reception program that, when executed, causes a computer in a diversity reception device, which receives a digitally modulated signal by single carrier modulation, to execute the diversity reception method according to the present invention.

REFERENCE SIGNS LIST

100: receiver (diversity reception device)

2#0 to 2#3: front ends (front end units)

4: combination unit (a portion of the combination and equalization unit)

5: equalization unit (a portion of the combination and equalization unit)

6: IFFT unit (a portion of the combination and equalization unit)

7: compensation unit (a portion of the combination and equalization unit)

8: trellis decoder (transmitted symbol estimation unit)

12: RSS calculation unit (a portion of the combination and equalization unit)

21: adaptive FIR filter (adaptive filter, a portion of a channel estimation unit)

22: echo profile (echo profile calculation unit, a portion of the channel estimation unit)

23: coefficient mask unit (a portion of the channel estimation unit)

EMBODIMENTS FOR CARRYING OUT THE INVENTION

In the subsequent description, the following mathematical symbols are employed:

π, pi: the circle circumference-diameter ratio j: the imaginary unit real(x): the real part of the complex number x imag(x): the imaginary part of the complex number x arg(x): the argument of the complex number x exp(x): the complex exponential function conj(x): the complex number that is conjugate to the complex number x a←b: update a with b In the following digital sequences and vectors, the following indices will be used without any particular mention. However these index symbols will be omitted as appropriate, provided that there is no risk of error.

s: segment index b: branch index k: time index c: frequency index q: tap index

It will be supposed that an N-point FFT (Fast Fourier Transform) is given by the following Equation:

[Formula 1]

$$F(c) = \frac{1}{\sqrt{N}} \sum_{k=0}^{N-1} f(k)\exp(-2 \cdot \pi \cdot j \cdot c \cdot k/N) \tag{1}$$

Moreover, it will be supposed that an N-point IFFT (Inverse Fast Fourier Transform) is given by the following Equation:

[Formula 2]

$$f(k) = \frac{1}{\sqrt{N}} \sum_{k=0}^{N-1} F(c)\exp(2\cdot\pi\cdot j\cdot c\cdot k/N) \quad (2)$$

Yet further, in the following description, an FFT without power normalization given by the following Equation will also be mentioned.

[Formula 3]

$$F(c) = \sum_{k=0}^{N-1} f(k)\exp(-2\cdot\pi\cdot j\cdot c\cdot k/N) \quad (3)$$

In this case, this will be explicitly described as an FFT without power normalization, in order to distinguish it from a normal FFT of the type mentioned above.

In the following, embodiments of the present invention will be explained with reference to the drawings. By way of example, a receiver for ATSC will be explained in the following. However it would also be possible to apply the present invention to a receiver for some other type of single carrier modulated signal, for example to a receiver for a signal that is modulated by the single carrier mode of the Chinese DTMB standard.

Note that, in the following explanation, the reference symbol that is appended to each element in the drawings is specified when the element is first mentioned, but if the element is not appearing for the first time, then mention of the reference symbol is sometimes omitted as appears appropriate, provided that there is no risk of error. Moreover, although block diagrams are used in the description of the drawings for explaining the details of signal processing, these block diagrams do not necessarily specify the hardware configuration of the receiver. The concrete hardware configuration for implementing the details of such signal processing may be of any desired type, such as LSI, FPGA, DSP, CPU plus software, or the like.

Embodiment #1

First, the embodiment #1 of the present invention will be explained.

Figure 1:
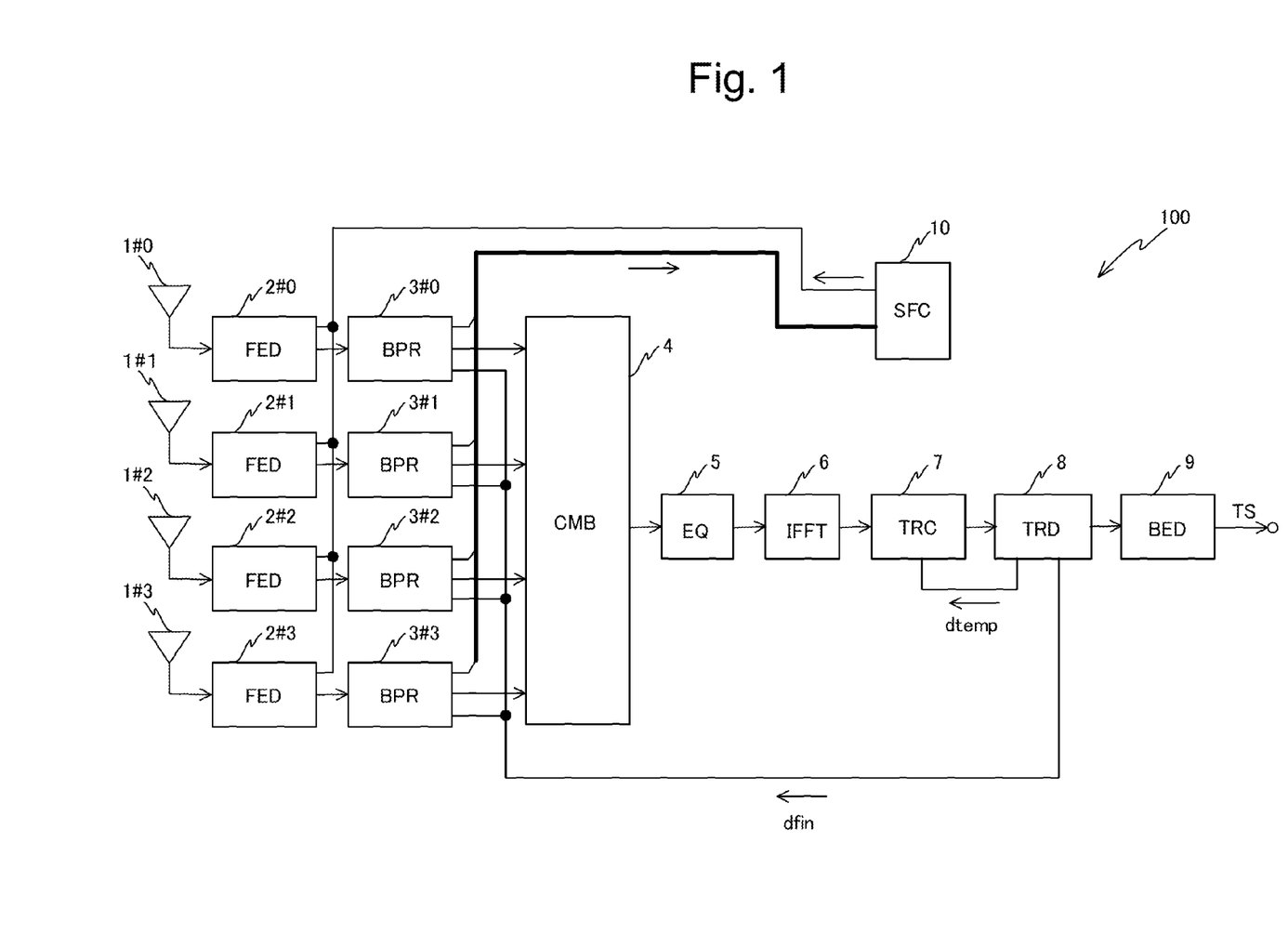
FIG. 1 is a block diagram of a receiver according to the embodiment #1.
Figure 2:
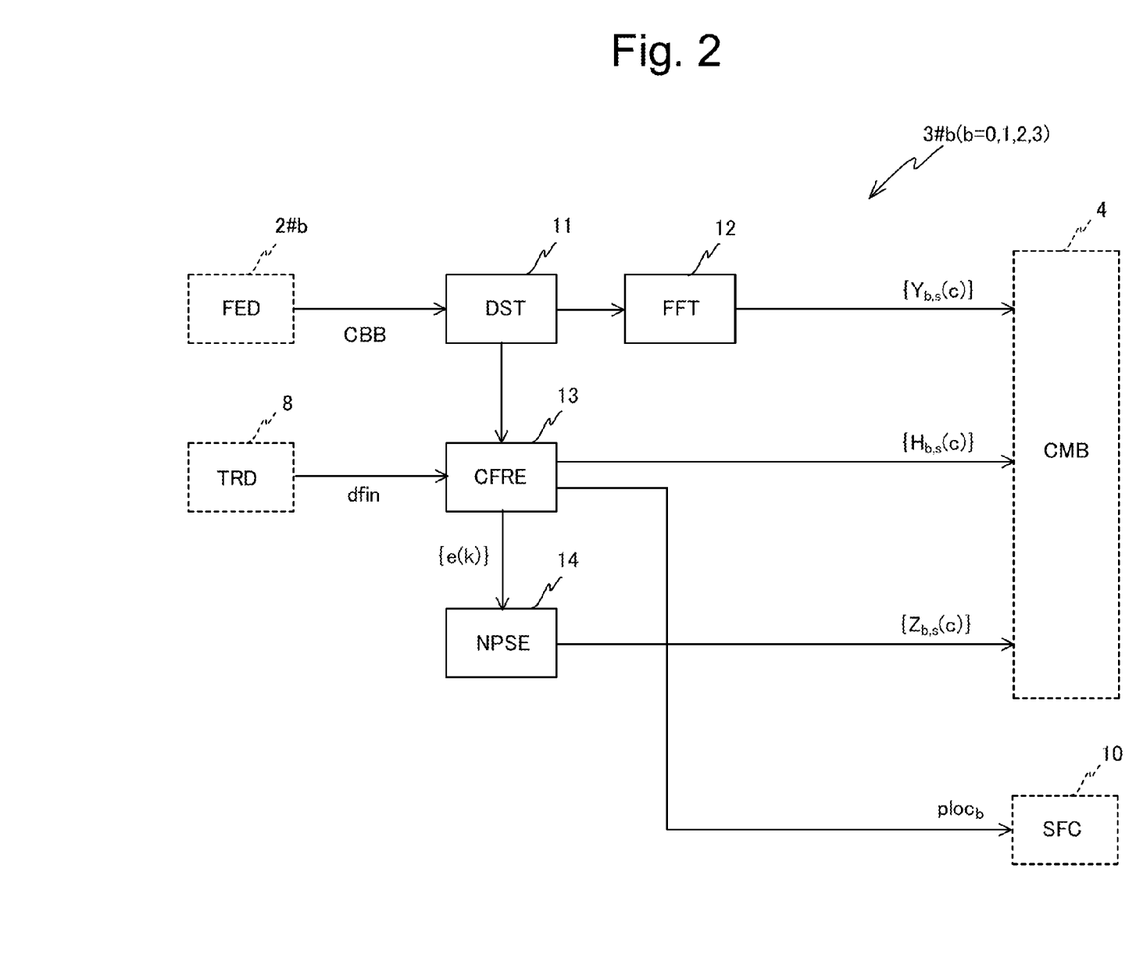
FIG. 2 is a block diagram of a branch processor (BPR) of FIG. 1.

Block diagrams are shown in FIGS. 1 and 2 for a receiver 100 according to the embodiment #1 of the present invention for reception of ATSC signals. These block diagrams correspond to processing in the steady state. Generally, initial processing (acquisition) is performed before steady processing is performed. In this initial processing, establishment of frame synchronization and calculation of initial coefficients for an adaptive filter that will be described hereinafter are performed.

First, the overall configuration of the receiver will be explained with reference to FIG. 1. The receiver comprises four antennas 1#b (where b=0, 1, 2, 3; and the same hereinafter), four front ends (FEDs) 2#b corresponding respectively to these antennas, four branch processors (BPRs) 3#b respectively corresponding to the antennas in a similar manner, a combination unit (CMB) 4, an equalization unit (EQ) 5, an IFFT unit (IFFT) 6, a compensation unit (TRC) 7, a trellis decoder (TRD) 8, a back end (BED) 9, and a sampling frequency control unit (SFC) 10. Note that, while the number of branches in the embodiment #1 is postulated as being four, a similar receiver configuration with a different number of branches would also be possible.

Figure 3:
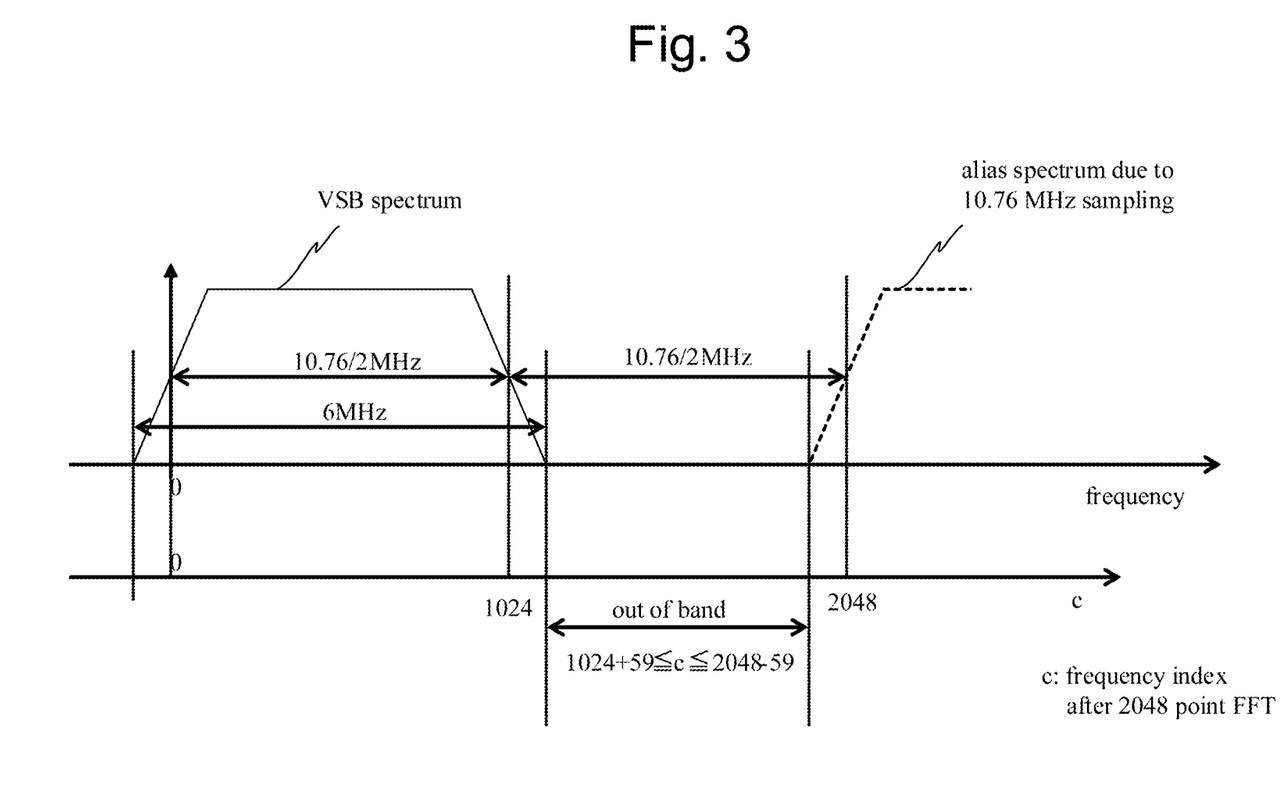
FIG. 3 is a figure for explanation of a VSB spectrum hypothesized in the embodiment #1.

Each of the front ends extracts a component of the desired channel from the time-continuous RF (Radio Frequency) signal that is inputted from the corresponding antenna, and converts this to a complex baseband signal (hereinafter termed a "CBB signal") which is a discrete time sequence, and outputs the CBB signal. Typically the front end performs processing such as RF filtering, frequency conversion to IF (Intermediate Frequency), IF filtering, A/D conversion, frequency conversion to baseband, sampling frequency conversion, and so on. Here, it will be supposed that the modulation frequency of the CBB signal is zero. And, it will be supposed that, in the CBB signal, the VSB spectrum is located on the positive frequency side, as shown in FIG. 3.

Note that the sampling frequency for the CBB signal is the same for all the branches, and is controlled by the sampling frequency control unit so as to synchronize with the symbol transmission rate (about 10.76 MHz). More specifically, the sampling frequency control unit controls the sampling frequency of the CBB signal by controlling the oscillation frequency of an NCO (Numerically Controlled Oscillator) used in the front end for sampling frequency conversion.

Each of the functional blocks of the embodiment #1 performs block unit processing (hereinafter termed "segment processing") in synchronization with "segment" prescribed by the ATSC standard. As a result of a single segment processing, an equalized signal having the length of a segment, in other words 832 symbols long, is outputted from the IFFT unit.

Each of the branch processors performs processing upon the CBB signal that is inputted thereto, and, in the processing of each segment, calculates the received signal spectrum (hereinafter termed the "RSS"), an estimate of the CFR (hereinafter termed the "estimated CFR"), and an estimation of the noise power spectrum (hereinafter termed the "estimated NPS"). The RSS and the estimated CFR are N-point complex vectors, while the estimated NPS is an N-point real number vector. Here, N is the number of points of the FFT, and is supposed to be 2048 in the embodiment #1. The vectors calculated in the processing of the s-th segment (where s=0, 1, 2 . . . ) by the b-th branch processor (3#b in FIG. 1) are expressed as follows. Note that the details of the branch processors will be described hereinafter.

RSS: $\{Y_{b,s}(c): c=0,1,\ldots,N-1\}$ (4)

Estimated CFR: $\{H_{b,s}(c): c=0,1,\ldots,N-1\}$ (5)

Estimated NPS: $\{Z_{b,s}(c): c=0,1,\ldots,N-1\}$ (6)

The combination unit combines the RSSs outputted from the branch processors on the basis of the estimated CFRs and the estimated NPSs. This combination is performed according to the maximal ratio combining manner for each frequency bin. More specifically, the combined spectrum $\{D_s(c)\}$ is calculated according to the following Equation:

[Formula 4]

$$D_s(c) = \sum_{b=0}^{3} \frac{\text{conj}(H_{b,s-1}(c))Y_{b,s}(c)}{Z_{b,s-1}(c)} \text{ for } c = 0, 1, \Lambda, N-1 \quad (7)$$

The estimated CFR and the estimated NPS, the values calculated in previous segment processing, in other words in the (s−1)th segment processing, are used. Moreover, it is assumed that the estimated CFR and the estimated NPS used for combination in the first segment processing (s=0) are calculated in advance on initial processing.

The equalization unit performs equalization according to the MMSE (Minimum Mean Square Error) rule. First, the equalization unit calculates the frequency response $\{Q_s(c)\}$ after combination according to the following Equation:

[Formula 5]

$$Q_s(c) = \sum_{b=0}^{3} \frac{|H_{b,s-1}(c)|^2}{Z_{b,s-1}(c)} \text{ for } c = 0, 1, \Lambda, N-1 \quad (8)$$

Subsequently, the equalization unit calculates the equalized spectrum $\{V(c)\}$ according to the following Equations. Here, $\sigma^2=21$ is the variance of the transmitted data symbols. Note that the symbols for the segment index are omitted.

[Formula 6]

$$J(c)=Q(c)+Q(-c)+1/\sigma^2 \quad (9)$$

for c=0

[Formula 7]

$$J(c)=Q(c)+Q(N-c)+1/\sigma^2 \quad (10)$$

for c=1, 2, $\Lambda$, N−1

[Formula 8]

$$V(c)=D(c)/J(c) \quad (11)$$

for c=0, 1, $\Lambda$, N−1

From the 2048 point complex vector obtained by IFFT on the equalized spectrum, the IFFT unit outputs the 832 points in the central portion, which is obtained by excluding the leading 608 points and the trailing 608 points from the 2048 points, to the compensation unit as an equalized signal.

The compensation unit tracks the phase error, the DC offset, and the amplitude error included in the equalized signal provided from the IFFT unit, and compensates them.

For each symbol, compensation is performed according to the following Equations:

$$w = v \cdot \exp(2 \cdot pi \cdot j \cdot ph) \cdot g \quad (12)$$

$$r = 2 \cdot \text{real}(w) + dc \quad (13)$$

Here, v is an input signal to the compensation unit, while r is the output signal of the compensation unit. Moreover, ph is a compensation phase value, g is a compensation gain value, and dc is a compensation DC offset value.

Each of the compensation values is updated so that r approaches the temporal decision value. Various types of methods can be employed as the updating method. For example, it would be acceptable to perform updating for each symbol according to the following Equations:

$$err = r - d\text{temp} \quad (14)$$

if $(|\text{imag}(w)|>1)$ then $perr=-err/\text{imag}(w)$, else $perr=0$ (15)

if $(|d\text{temp}+dc|>3)$ then $gerr=err/(d\text{temp}+dc)$, else $gerr=0$ (16)

$$g \leftarrow g - g\text{step}*gerr \quad (17)$$

$$ph \leftarrow ph - p\text{step}*perr \quad (18)$$

$$dc \leftarrow dc - d\text{step}*err \quad (19)$$

Here, dtemp is a temporal decision value, and gstep, pstep, and dstep are the updating steps for the compensation values.

Here, the temporal decision value provide estimated values of the transmitted symbol before the pilot is superposed, and are any one of the eight integer values $\{\pm1, \pm3, \pm5, \pm7\}$. In the simplest manner, these temporal decision values can be calculated by a hard decision by using 8-value slicer. However, it is possible to obtain a less erroneous decision value by employing a Viterbi algorithm. In the embodiment #1, the temporal decision value for each symbol is provided from the trellis decoder that will be described below.

The trellis decoder performs Viterbi decoding upon the compensated signal outputted from the compensation unit. The decoded bit sequence that is obtained is provided to the back end. Moreover, the trellis decoder provides the final decision value (dfin) to the branch processor and provides the temporal decision value to the compensation unit.

The calculation of the temporal decision value will now be explained. For each of the symbols that is inputted, the trellis decoder of the embodiment #1 is required to estimate the value of the transmitted symbol with very little delay, and is required to provide the estimate value to the compensation unit as the temporal decision value. In order to fulfill the requirement, the trellis decoder of the embodiment #1 calculates the temporal decision value by accompanying with ACS (Add-Compare-Select) processing performed for each input signal.

ACS processing is a per se known technique that is widely used in Viterbi decoding. Generally, in ACS processing, a plurality of survivor paths are determined upon the trellis diagram on the basis of the input symbol. Among the plurality of survivor paths that have been determined by the ACS processing, the trellis decoder of the embodiment #1 obtains the path whose likelihood is highest, in other words the newest encoder output corresponding to the survivor path whose likelihood is maximal, and takes this as the temporal decision value.

The calculation of the final decision value and of the decoded bit sequence will now be explained. A compensated signal of 832 symbols for each segment processing are inputted from the compensation unit to the trellis decoder of the embodiment #1. The trellis decoder performs the ACS processing described above upon each symbol in the compensated signal. And, at the time point that the sequence processing ends; the trellis decoder calculates a decoded bit sequence for the 832 symbols and the sequence of final decision values, all together. The decoded bit sequence is calculated as the trellis encoder input sequence corresponding to the maximum likelihood survivor path at the time point that the segment processing ends. On the other hand, the sequence of final decision values is calculated as the trellis encoder output sequence corresponding to the maximum likelihood survivor path. Note that the final decision value is a value that gives an estimation of the transmitted symbol after pilot superimposition, and its value is equal to one of the eight integer values $\{\pm1, \pm3, \pm5, \pm7\}$ with the pilot DC component 1.25 added thereto.

Note that symbols that are not trellis encoded (i.e. non-encoded symbols) are also inputted to the trellis decoder. For example, the first four symbols of each segment are the DSS (Data Segment Sync) prescribed by the ATSC standard, and the values thereof that have been transmitted are already known to be $\{5, -5, -5, 5\}$. Moreover, the first segment of the ATSC field includes a plurality of reserve bits. These reserve bits are not trellis encoded, and it is stipulated that the values thereof are only specified either 5 or −5. The trellis decoder of the embodiment #1 does not perform Viterbi decoding if the input symbol corresponds to a non-encoded symbol of this type. And, if the input symbol corresponds to an already known, then the transmitted symbol value is used as its determined value. Furthermore, if the input symbol corresponds to a reserve bit, then the hard decision result obtained with a two-value slicer is used as its determined value.

The back end performs a series of decoding processes; concretely, it performs deinterleaving, Reed-Solomon decoding, and derandomization, processing of various types, and outputs an MPEG transport stream (MPEG-TS) obtained as a result. The MPEG-TS is converted to video and audio by appropriate decoding processing.

The branch processors will now be explained. A block diagram of the interior of one branch processor is shown in FIG. 2. Each of the branch processors comprises a data distribution unit (DST) 11, an RSS calculation unit (FFT) 12, a CFR estimation unit (CFRE) 13, and an NPS estimation unit (NSPE) 1.

In each segment processing, the data distribution unit extracts sectional signals from the CBB signal and provides them to the RSS calculation unit and to the CFR estimation unit. The sectional signal of 832 points that has been extracted so that there are no gaps or overlapping on the CBB signal is provided to the CFR estimation unit. In other words, if the CBB signal is taken to be {cbb(k)}, then the sectional signal that is provided to the CFR estimation unit in the s-th segment processing is {cbb(k): ko+832s≤k<ko+832s+831}. Here, the value of ko is determined by the initial processing. On the other hand, a sectional signal of 2048 points (the number of points N in the FFT) is provided to the RSS calculation unit, with overlap interval of 608 points each being added before and after the interval provided to the CFR estimation unit.

The RSS calculation unit calculates the RSS by performing a FFT upon the 2048 point section signal provided from the data distribution unit for each segment processing.

The CFR estimation unit estimates the CFR for each branch on the basis of the CBB signal provided from the data distribution unit and the final decision values provided from the trellis decoder. Moreover, it provides the residual signal obtained together with the estimation is provided to the NPS estimation unit.

Note that the details of the CFR estimation unit will be described hereinafter.

The NPS estimation unit estimates the NPS on the basis of the residual signal provided from the adaptive FIR filter.

Figure 4:
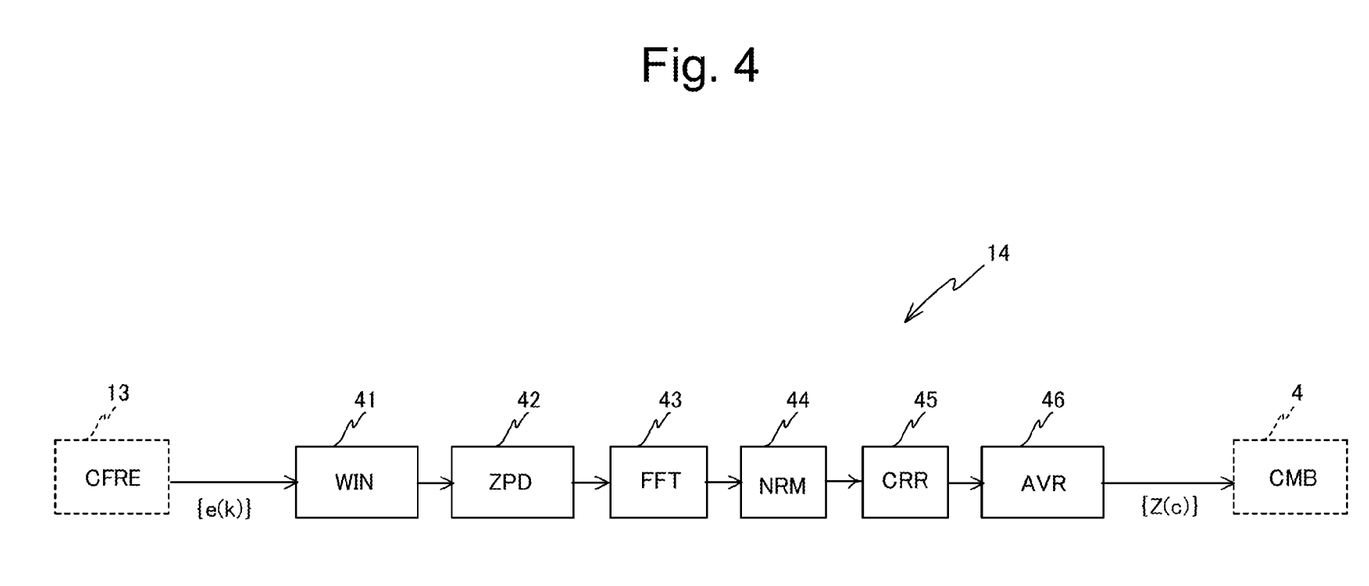
FIG. 4 is a block diagram of an NPS estimation unit (NPSE) in FIG. 2.

As shown in FIG. 4, the NPS estimation unit comprises a windowing unit (WIN) 41, a zero padding unit (ZPD) 42, a Fourier transformation unit (FFT) 43, a norm calculation unit (NRM) 44, a power correction unit (CRR) 45, and an averaging unit (AVR) 46.

The windowing unit performs windowing upon the residual signal {e(k): k=0, 1, . . . 831} of the 832 symbols provided from the adaptive FIR filter in the processing of each segment. A raised-cosine window, a Hamming window, a Blackman window or the like may be used as a windowing function. For example, if a raised-cosine window is used, then the windowing may be performed according to the following Equation:

$$e'(k) = \text{wind}(k) \cdot e(k) \quad (20)$$

for k=0, 1, . . . 831

Here, e'(k) is the signal after windowing, and wind(k) is a raised cosine window function given by the following Equation:

[Formula 9]

$$\text{wind}(k) = \sqrt{8/3} \, \frac{1 - \cos(2\pi k/832)}{2} \quad (21)$$

The zero padding unit performs zero padding at the back end of the signal after windowing, and extends it to N (2048) points.

The Fourier transformation unit performs an N-point FFT upon the output of the zero padding unit.

The norm calculation unit calculates a norm value for each of the N-point complex numbers calculated by the FFT.

The power correction unit corrects the power of the norm values, which has been decreased by the zero padding, by multiplying them by (2048/832).

And the averaging unit calculates the estimated NPS by averaging the corrected norm values. This averaging may, for example, be implemented with a first order IIR filter. In this case, taking the norm value of the power after amendment as being $\{G_s(c): c=0, 1, \ldots N-1\}$, the estimated NPS $\{Z_s(c): c=0, 1, \ldots N-1\}$ is calculated according to the following Equation:

$$Z_s(c) =_{s-1}(c) + \gamma(G_a(c) - Z_{s-1}(c)) \quad (26)$$

Here, γ is the IIR filter coefficient. The estimated NPS calculated here is used by the combination unit in the next segment processing.

The CFR Estimation Unit

Figure 5:
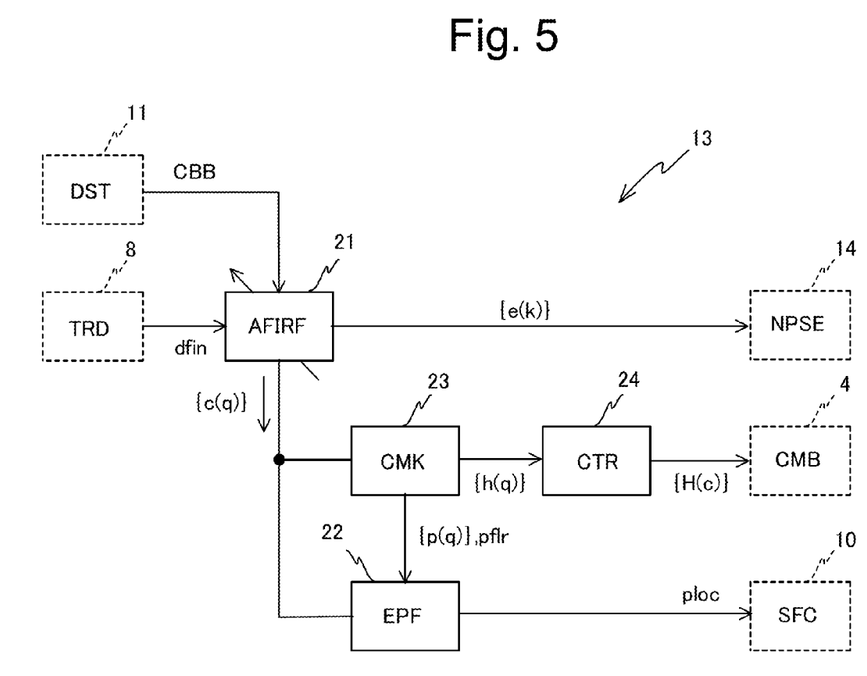
FIG. 5 is a block diagram of a CFR estimation unit (CFRE) in FIG. 2.

The configuration of the CFR estimation unit of the embodiment #1 is shown in FIG. 5. The CFR estimation unit of the embodiment #1 comprises an adaptive FIR filter (AFIRF) 21, a coefficient transformation unit (CTR) 22, an echo profiler (EPF) 22, a coefficient mask unit (CMK) 23, and a coefficient transformation unit (CTR) 24.

Figure 6:
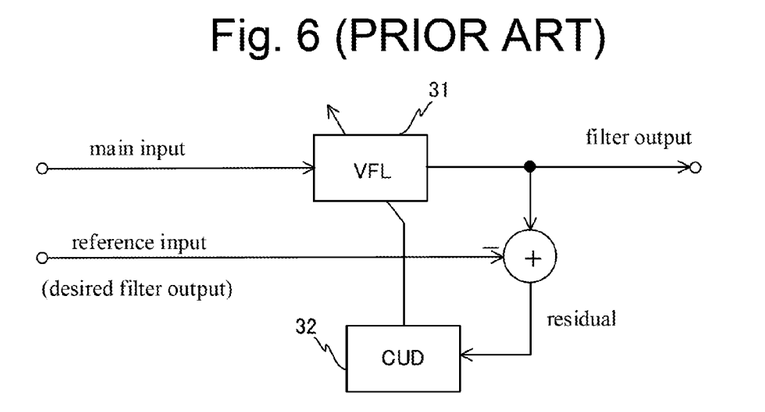
FIG. 6 is a block diagram of a normal adaptive filter.

Now, a per se known adaptive filter will be explained. A typical configuration for an adaptive filter is shown in FIG. 6. As shown in the figure, this adaptive filter comprises a variable coefficient filter (VFL) 31 and a coefficient updating unit (CUD) 32. Generally, an adaptive filter requires two input signals. One of these is a main input signal that is inputted to the variable coefficient filter, while the other is a reference input signal that gives a desired filter output. The coefficient updating unit updates the filter coefficients so that the filter output signal becomes closer to the desired filter output signal. In more detail, on the basis of a residual signal which is the difference between the actual filter output signal and the reference input signal, the coefficient updating unit updates the filter coefficients so that the power of this residual signal becomes low.

The final decision values provided from the trellis decoder are sent to the adaptive FIR filter of the embodiment #1 as its main input signal. Moreover, the CBB signal provided from the data distribution unit is sent as the reference input signal. As previously described, the adaptive FIR filter updates the coefficient vector of the FIR filter adaptively so that the FIR filter output becomes closer to the reference input signal. As a result, the coefficient vector provides an estimated value of the CIR.

A per se known LMS (Least Mean Square) algorithm is used for the coefficient updating. Note that it would also be possible to apply some other algorithm, for example a RLS (Recursive Least Squares) algorithm or the like.

The details of the processing performed by the adaptive FIR filter of the embodiment #1 will now be explained in the following. It will be supposed that, in the processing of some segment, the CBB signal provided from the data distribution unit is {y(k): k=0, 1, . . . 831} and the sequence of final decision values provided from the trellis decoder is {d(k): k=0, 1, . . . 831}. And it will be supposed that, in the embodiment #1, the tap length of the adaptive FIR filter is 512, the coefficient vector is {c(q): q=0, 1, . . . 511}, and the tap vector is {x(q): q=0, 1, . . . 511}. At this time, the processing of the adaptive FIR filter for each symbol is given by the following Equations:

$$\{x(0),x(1), \ldots x(511)\} \leftarrow \{d(k),x(0), \ldots x(510)\} \quad (23)$$

$$r(k)=c(0)x(0)+c(1)x(1)+ \ldots +c(511)x(511) \quad (24)$$

$$e(k)=r(k)-y(k) \quad (25)$$

$$c(q) \leftarrow c(q)-\mu e(k)x(q) \quad (26)$$

for q=0, 1, . . . 511

Equation (23) shows the shift processing of the tap vector. By using Equation (24), the output r(k) of the adaptive FIR filter is calculated as being the sum of products of the coefficient vector and the tap vector. By using Equation (25), the residual signal e(k) is calculated as being the differential between the r(k) and the actually received CBB signal. And, in Equation (26), the coefficient vector is updated according to the LMS algorithm. Due to this updating, the power of the residual signal is minimized. Note that μ is the updating step. With the adaptive FIR filter of this example, the processing described above is performed 832 times in the processing for each segment, in other words for k=0, 1, . . . 831. The residual signal {e(k): k=0, 1, . . . 831} is provided to the NPS estimation unit.

It will be supposed that the initial value of the coefficient vector is calculated by the initial processing. The initial value may be calculated by any one of various methods; for example, it could be calculated on the basis of correlation between the CBB signal and the PN511 sequence prescribed by the ATSC standard.

The echo profiler calculates a multipath power distribution, i.e. a so-called echo profile, by averaging the powers of the coefficients provided from the adaptive FIR filter for each segment.

If the first order IIR filter is employed for the averaging, then the echo profile {p(q): q=0, 1, . . . 511} is calculated and updated for each segment according to the following Equation:

$$p(q) \leftarrow p(q)-\xi \cdot (p(q)-|c(q)|^2) \quad (27)$$

for q=0, 1, . . . , 511

Figure 7:
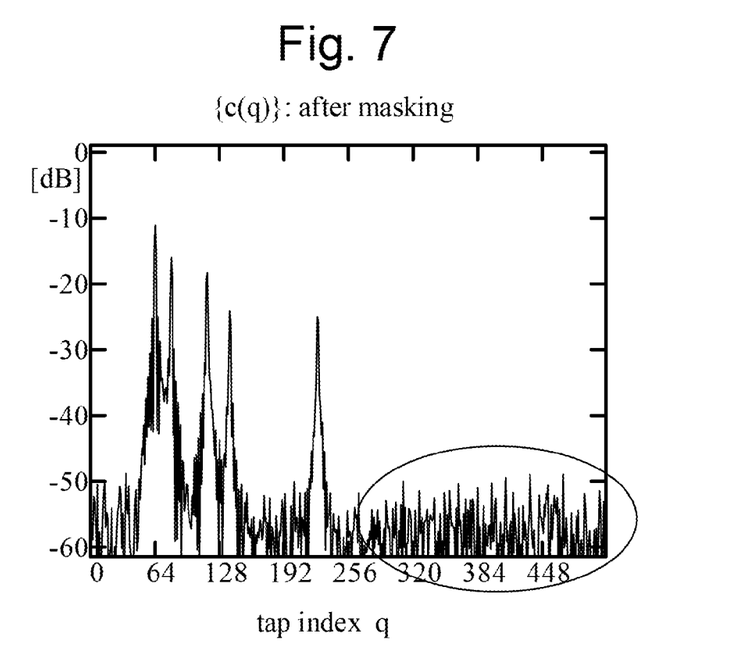
FIG. 7 is a figure showing an example of a coefficient vector before masking.

Here, {c(q): q=0, 1, . . . 511} is the coefficient vector provided from the adaptive FIR filter. Moreover, ξ is the coefficient of the IIR filter. An example of an echo profile that has been calculated in this manner is shown in FIG. 7. It should be noted that the tap index q corresponds to the multipath delay time.

The echo profiler also calculates the power floor pflr of the echo profile. In the simplest manner, the power floor pflr may be calculated as the minimum value of the 512 elements of the echo profile {p(q): q=0, 1, . . . , 511}.

Figure 8:
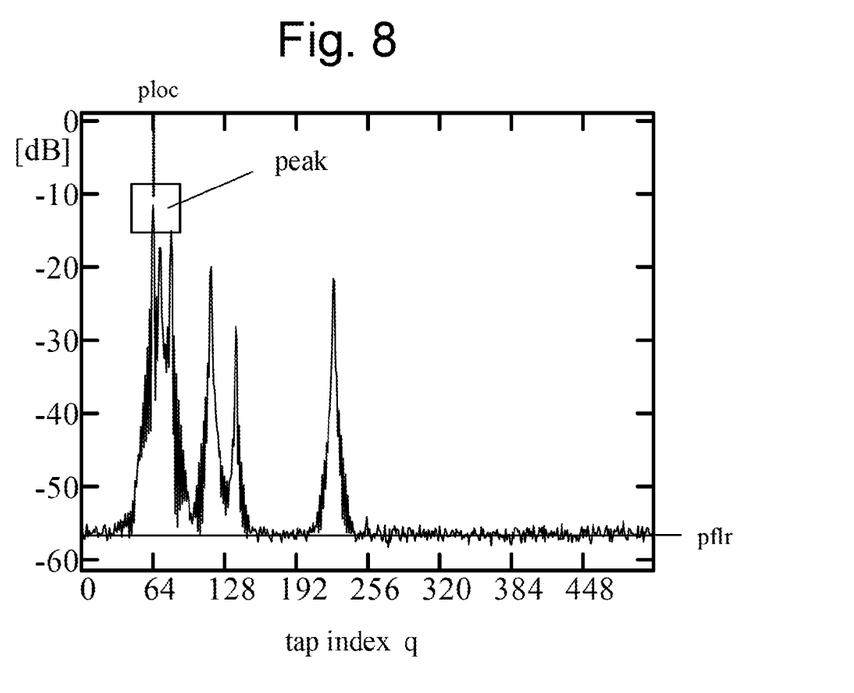
FIG. 8 is a figure for explanation of a calculated echo profile.

Moreover, it would also be acceptable to calculate the power floor pflr as follows. First, the echo profile {p(q): q=0, 1, . . . , 511} is divided into 16 sections of 32 taps each, and then the average power is calculated for each of these sections. The minimal one of the average powers calculated for the 16 sections is taken as the power floor pflr. By performing the calculation in this manner, it is possible to prevent influence of imperfections of averaging due to the IIR filter, in concrete terms to prevent the power floor pflr from being calculated as being lower. An example of a power floor pflr that has been calculated by the above method is shown in FIG. 8.

The echo profiler further performs extraction of the peak location of the echo profile. An example of such a peak location ploc that has been extracted is shown in FIG. 8.

The coefficient mask unit performs mask processing of the coefficient vector according to the following Equation:

if $(p(q)<\lambda \cdot \text{pflr})$: $h(q)=0$, else: $h(q)=((p(q)-\lambda \cdot \text{pflr})/p(q)) \cdot c(q)$ (28)

Figure 9:
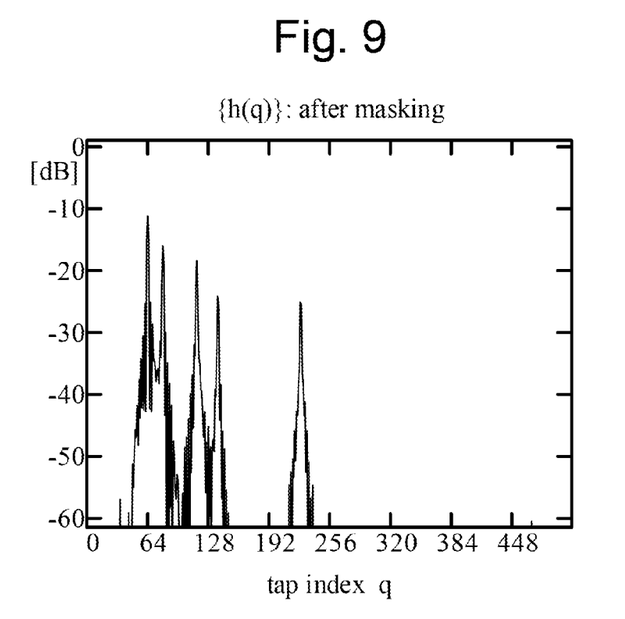
FIG. 9 is a figure showing an example of a coefficient vector after masking.

Here, the value λ is set to around 1 to 2. An example of the coefficient vector after masking is shown in FIG. 9. Note that it would also be possible to simplify the mask processing, as in the following Equation:

if $(p(q)<\lambda \cdot \text{pflr})$: $h(q)=0$, else: $h(q)=c(q)$ (29)

By masking the coefficient vector according to the echo profile in this manner, it is possible greatly to decrease deterioration of the accuracy of channel estimation due to the influence of noise.

The coefficient transformation unit calculates the estimated CFR on the basis of the coefficient vector h(q) after mask processing.

In concrete terms, the coefficient transformation unit calculates the estimated CFR according to the following Equations:

$$\{h'(q): q=0,1 \ldots 2047\}=\{h(0),h(1), \ldots ,h(511),0,0, 0, \ldots \} \quad (29a)$$

$$\{H'(c): c=0,1, \ldots ,2047\}=\text{FFT}(\{h'(q)\}) \quad (29b)$$

if $(1024+59 \leq c \leq 2048-59)$: $H(c)=0$, else: $H(c)=H'(c)$ (29c)

According to Equation (29a), the coefficient vector is extended to an N-point vector by zero padding. Then, according to Equation (29b), the frequency response {H'(c)} of the adaptive FIR filter is calculated by performing an N-point FFT (without power normalization) upon the extended coefficient vector. Moreover, according to Equation (29c), the estimated CFR {H(c)} provided to the combination unit is calculated by forcibly setting terms in {H'(c)} that correspond to outside the 6 MHz channel band to zero. The estimated CFR calculated here is used by the combination unit in the next segment processing.

The sampling frequency control unit controls the sampling frequency of the CBB signal on the basis of the peak location that has been calculated by the echo profiler.

First, the sampling frequency control unit selects one peak location, at which the value of the corresponding echo profile is maximal, among the peak locations provided from each of the four branches.

Then, the sampling frequency control unit controls the sampling frequency in the front end so that the peak location that has been selected in this manner approaches a predetermined tap location upon the echo profile.

Note that while in the above description an example has been shown in which control is performed on the basis of the peak location, at which the value of the corresponding echo profile is a maximal, among the four peak locations. Instead of the above, it would also be possible to perform sampling frequency control on the basis of the average location of the four peak locations, so that the average location becomes the predetermined tap location.

As described above, the receiver of the embodiment #1 employs the echo profile that has been calculated for coefficient vector masking, and performs timing synchronization control on the basis of the employed echo profile. By doing this, it is possible to achieve stabilized timing synchronization control without any accompanying great increase of calculation resources, even if, due to a severe multipath environment, "DSS cannot be observed properly" or "attenuation is extremely high in the neighborhood of the Nyquist frequency".

Note that the correspondence between structural elements in the Claims and structural elements in the embodiment #1 is as follows:

"diversity reception device": the receiver 100;
"front end unit": the front end 2#b;
"combination and equalization unit": the RSS calculation unit 12, the coefficient transformation unit 24, the combination unit 4, the equalization unit 5, the IFFT unit 6, and the compensation unit 7;
"transmitted symbol estimation unit": the trellis decoder 8;
"sampling frequency control unit": the sampling frequency control unit 10;
"channel estimation unit": the adaptive FIR filter 21, the echo profiler 22, and the coefficient mask unit 23;
"adaptive filter": the adaptive FIR filter 21;
"echo profile calculation unit": the echo profiler 22.

Embodiment #2

In the embodiment #1, an example was shown in which sampling frequency control was performed on the basis of the peak location upon the echo profile. However, when considered from the standpoint of sampling frequency control, the peak location is not optimally representative of the echo profile. Due to this, it is supposed that sampling frequency control may in some cases not be performed appropriately.

Figure 10:
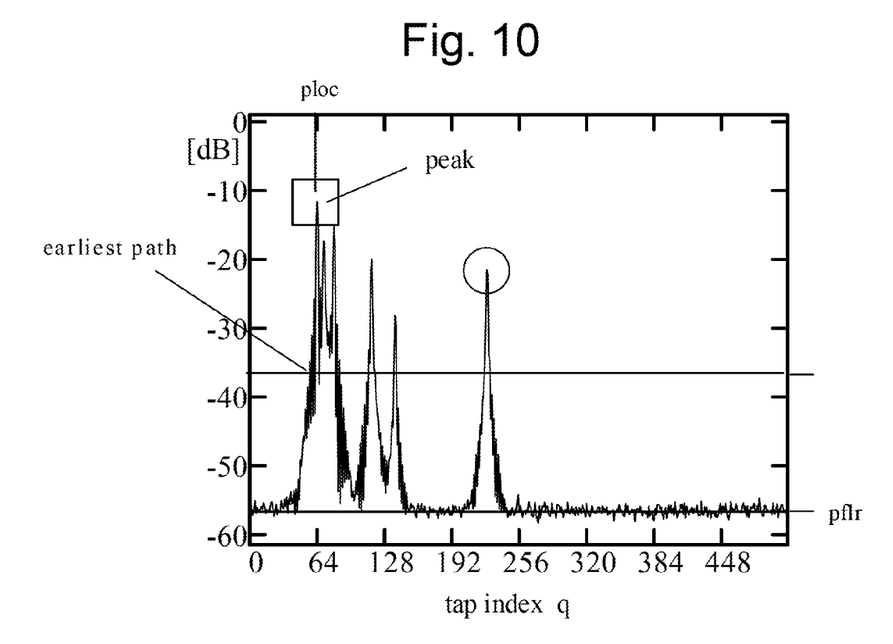
FIG. 10 is a figure showing an example of detection of an earliest path.

For example, in FIG. 10, the peak of the echo profile is shown as surrounded by a square. In many cases, the peak corresponds to the direct path of propagation from the transmitting antenna to the receiver. In other words, in an environment in which the transmitting antenna is directly visible from the position of the receiver, this peak corresponds to the shortest path of propagation from the transmitting antenna, and the delay amount thereupon is the minimum for all the multipath components. Accordingly, controlling the location of this peak, in the effective tap range of the CFR estimation unit, to a location in which the tap index is small (64 in the case of FIG. 10) is considered to be a desirable result. By performing control in this manner, the CFR estimation unit is able to detect the corresponding delayed wave in the range of tap index from 64 to 511.

However, a mobile receiver may be used even in an environment in which the transmitting antenna is not directly visible. In this type of non-directly-visible environment, the peak location does not necessarily correspond to the shortest path of propagation. For example, a case may be considered in which, as a result of shifting from the reception location in which the echo profile shown in FIG. 10 was obtained, the direct path of propagation is intercepted by a building or the like. Suppose that, in this type of case, the component shown as surrounded by the square in FIG. 10 is attenuated, and that the reflected wave component shown as surrounded by the circle becomes dominant. As a result, the peak location changes from the location shown as surrounded by the square to the location shown as surrounded by the circle. In this case, if control is performed so that the component surrounded by a circle becomes the above described predetermined tap location (i.e. 64), then a multipath component having a short delay comes to appear on the left side of the effective tap range of the CFR estimation unit, so that a state of affairs is established in which it is not possible to maintain normal demodulation.

In order to avoid this situation, the echo profiler of the embodiment #2 detects upon the echo profile, not the peak location, but rather the location of the earliest path. When taking the location of the earliest path, for example, it will be acceptable to take the smallest tap index for which the echo profile is greater than a predetermined number of times pflr, for example 20 dB (refer to FIG. 10). Alternatively, it would also be acceptable to arrange to take the smallest tap index that is greater than a predetermined number of times the total sum of multipath powers, for example −30 dB. Here, the sum total of multipath powers is obtained by adding together the echo profile values at all the tap indices.

And, the sampling frequency control unit of the embodiment #2 performs control of the sampling frequency as the minimal one, of which the tap location is minimal among the locations of the four earliest paths that have been detected for each branch, becomes the predetermined tap location.

By performing control in this manner, the receiver of the embodiment #2 is able to achieve satisfactory reception, even in a severe multipath environment in which the transmitting antenna is not directly visible.

Note that the correspondence between structural elements in the Claims and structural elements in the embodiment #2 is the same as in the case of the embodiment #1 described above.

The invention claimed is:

1. A diversity reception device that receives a signal that has been digitally modulated by single carrier modulation, comprising:
   a plurality of branch processing units to each of which one of a plurality of received signals is individually inputted;
   a combination and equalization unit calculating an equalized signal from said plurality of received signals;
   a transmitted symbol estimation unit calculating an estimated transmitted symbol from said equalized signal; and
   a sampling frequency control unit, wherein
   each of said branch processing units comprises:
      a front end unit converting said received signal to a baseband signal; and
      a channel estimation unit calculating an estimated channel characteristic on the basis of said baseband signal and said estimated transmitted symbol, wherein
   each of said channel estimation units comprises:
      an adaptive filter taking said estimated transmitted symbol as filter input and generating a desired filter output signal from said received signal; and
      an echo profile calculation unit calculating an echo profile from filter coefficients of said adaptive filter,
   said combination and equalization unit calculates said equalized signal on the basis of said estimated channel characteristic, and
   said sampling frequency control unit controls sampling frequencies of said baseband signal in said front end units on the basis of said echo profiles.

2. The diversity reception device according to claim 1, wherein
the sampling frequency of said baseband signal is common to said plurality of branch processing units.

3. The diversity reception device according to claim 1, wherein
said sampling frequency control unit controls the sampling frequencies of said baseband signal on the basis of all of the echo profiles calculated by each of said plurality of branch processing units.

4. The diversity reception device according to claim 1, wherein
each of said channel estimation units calculates said estimated channel characteristic on the basis of the filter coefficients of said adaptive filter and said echo profile.

5. The diversity reception device according to claim 1, wherein
each of said echo profile calculation units calculates said echo profile on the basis of a time period average of norm values of the filter coefficients of said adaptive filter.

6. A diversity reception method employed by a diversity reception device that receives a signal that has been digitally modulated by single carrier modulation, said diversity reception method comprising the steps of:
a branch processing step of performing processing upon each of a plurality of received signals;
a combining and equalizing step of calculating an equalized signal from said plurality of received signals;
a transmitted symbol estimating step of calculating an estimated transmitted symbol from said equalized signal; and
a sampling frequency controlling step of performing control of sampling frequencies in front end units, wherein
said branch processing step comprises:
a signal band conversion step of converting said received signal to a baseband signal; and
a channel estimation step of calculating an estimated channel characteristic on the basis of said baseband signal and said estimated transmitted symbol, and
said channel estimation step comprises: an echo profile calculation step of calculating an echo profile from filter coefficients of an adaptive filter that takes said estimated transmitted symbol as filter input and generates a desired filter output signal from said received signal,
said equalized signal is calculated by said combining and equalizing step on the basis of said estimated channel characteristic, and
the sampling frequencies of said baseband signal are controlled by said sampling frequency controlling step on the basis of said echo profile.

7. A non-transient computer readable medium having recorded thereon a reception program that, when executed, causes a computer in a diversity reception device, which receives a digitally modulated signal by single carrier modulation, to execute the diversity reception method according to claim 6.

* * * * *